US012062301B2

(12) United States Patent
Wang et al.

(10) Patent No.: US 12,062,301 B2
(45) Date of Patent: Aug. 13, 2024

(54) DISPLAY APPARATUS

(71) Applicant: BOE Technology Group Co., Ltd., Beijing (CN)

(72) Inventors: Wenbin Wang, Beijing (CN); Lei Cao, Beijing (CN); Junmin Sun, Beijing (CN); Zifeng Wang, Beijing (CN); Yan Ren, Beijing (CN); Jinggang Wei, Beijing (CN); Yunpeng Wu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 98 days.

(21) Appl. No.: 17/908,411

(22) PCT Filed: Oct. 20, 2021

(86) PCT No.: PCT/CN2021/124974
§ 371 (c)(1),
(2) Date: Aug. 31, 2022

(87) PCT Pub. No.: WO2022/111145
PCT Pub. Date: Jun. 2, 2022

(65) Prior Publication Data

US 2023/0086408 A1 Mar. 23, 2023

(30) Foreign Application Priority Data

Nov. 27, 2020 (CN) ......................... 202011366818.7

(51) Int. Cl.
*G09F 13/04* (2006.01)

(52) U.S. Cl.
CPC ...... *G09F 13/0456* (2021.05); *G09F 13/0445* (2021.05)

(58) Field of Classification Search
CPC ......................... G09F 13/0456; G09F 13/0445
(Continued)

(56) References Cited

U.S. PATENT DOCUMENTS 9,715,139 B2 * 7/2017 Lee ....................... G02F 1/1336
10,394,351 B2 * 8/2019 Chien ................... G06F 1/1603
(Continued)

FOREIGN PATENT DOCUMENTS

CN 201927291 U 8/2011
CN 204879335 U 12/2015
(Continued)

*Primary Examiner* — Zhen Y Wu
(74) *Attorney, Agent, or Firm* — Nath, Goldberg & Meyer; Joshua B. Goldberg

(57) ABSTRACT

There is provided a display apparatus, including: a display module; a first side frame and a second side frame on two sides of the display module in a width direction of the display module; a fixing structure on a non-light-emitting side of the display module and detachably connected to the first side frame and the second side frame, the fixing structure being configured to fix the display module; and an adapter, including a first connection part and a second connection part which are fixedly connected. At least one of a first side surface of the first side frame facing the display module or a second side surface of the second side frame facing the display module is detachably connected to the first connection part, and the second connection part is detachably connected to the fixing structure.

14 Claims, 15 Drawing Sheets

(58) Field of Classification Search
USPC ........................................................ 340/5.91
See application file for complete search history.

(56) References Cited

U.S. PATENT DOCUMENTS 10,803,786 B2 * 10/2020 Yoon ..................... G09F 9/3026
10,909,890 B1 * 2/2021 Apostle ............... G09F 13/0445
2006/0290835 A1 * 12/2006 Sakuma ............ G02F 1/133308 348/794
2009/0122476 A1 * 5/2009 Won .................. G02F 1/133308 361/679.21
2010/0048249 A1 * 2/2010 Furuta ................. H04M 1/0266 455/566
2010/0220257 A1 * 9/2010 Sakamoto ......... G02F 1/133308 349/58
2010/0265638 A1 * 10/2010 Sakamoto .............. F16M 11/08 248/688
2011/0080375 A1 * 4/2011 Chikazawa ............... G06F 1/20 361/679.01
2012/0281158 A1 * 11/2012 Chen ................. G02F 1/133308 29/428
2014/0208626 A1 * 7/2014 Moon ................. G09F 15/0012 40/729
2014/0307196 A1 * 10/2014 Lin ................... G02F 1/133308 349/58
2015/0192952 A1 * 7/2015 Jung ..................... G06F 1/1652 361/747
2016/0026029 A1 * 1/2016 Kawada ............ G02F 1/133308 349/58
2016/0054518 A1 * 2/2016 Uchimi ............. G02F 1/133308 349/65
2016/0213173 A1 * 7/2016 Xu .................... G02F 1/133308
2016/0295717 A1 * 10/2016 Kim .......................... G09F 7/22
2017/0105293 A1 * 4/2017 Kim .......................... G09F 9/00
2017/0171997 A1 * 6/2017 Xu ....................... H05K 5/0017
2018/0317330 A1 * 11/2018 Dunn .................. G02F 1/13338
2019/0120266 A1 * 4/2019 Li ..................... G02F 1/133308
2019/0239365 A1 * 8/2019 Dunn .................. G09F 13/0413
2020/0022270 A1 * 1/2020 Mori ...................... H01F 7/0263
2020/0110441 A1 * 4/2020 Castro .............. H04N 21/43615
2020/0375020 A1 * 11/2020 Lim ..................... H05K 1/0215
2021/0043119 A1 * 2/2021 Wang ....................... G09F 9/302
2021/0233898 A1 * 7/2021 Okuda .................... G09F 19/00
2021/0345499 A1 * 11/2021 Zhou ........................ G09F 9/302
2023/0087511 A1 * 3/2023 Xiao .................. H05K 7/20154 361/696
2023/0111243 A1 * 4/2023 Kang ................ G02F 1/133314 349/56

FOREIGN PATENT DOCUMENTS

CN 206594971 U 10/2017
CN 207489377 U 6/2018
CN 108257513 A 7/2018
CN 208819535 U 5/2019
CN 110491282 A 11/2019
CN 209708597 U 11/2019
CN 209804246 U 12/2019
CN 210835513 U 6/2020
CN 210860548 U 6/2020
JP 2001109390 A 4/2001

* cited by examiner

DISPLAY APPARATUS

TECHNICAL FIELD

The present disclosure relates to the field of display technology, and in particular, relates to a display apparatus.

BACKGROUND

The electronic signage is a high-tech product that demonstrates business, financial, and entertainment information through a large-sized screen terminal display device. It aims to play advertising information for specific crowds in specific physical places and specific time periods, so as to achieve a high-quality advertising effect.

SUMMARY

An embodiment of the present disclosure provides a display apparatus, including:

a display module;

a first side frame and a second side frame on two sides of the display module in a width direction of the display module;

a fixing structure on a non-light-emitting side of the display module and detachably connected to the first side frame and the second side frame, the fixing structure being configured to fix the display module; and an adapter, including a first connection part and a second connection part which are fixedly connected, at least one of a first side surface of the first side frame facing the display module or a second side surface of the second side frame facing the display module is detachably connected to the first connection part, and the second connection part is detachably connected to the fixing structure.

In some implementations, the fixing structure includes:

a connecting beam having two ends detachably connected to the first side frame and the second side frame, respectively;

a first holder between the first side frame and the second side frame, the first holder and the connecting beam being respectively located on two opposite sides of the display module in a first direction, the first direction being a height direction of the display apparatus, the first holder being detachably connected to the first side frame and the second side frame:

a second holder at least partially on a side of the display module in a second direction, the second direction being a thickness direction of the display apparatus, the second holder being detachably connected to the first holder; and a backplane on a side of the second holder facing away from the display module:

the second connection part is detachably connected to the backplane.

In some implementations, a plurality of adapters are provided, and at least one of the adapters further includes a third connection part detachably connected to the second holder.

In some implementations, the second holder includes: a plurality of cross beams and a plurality of longitudinal beams, the cross beams are configured to be detachably connected to the display module, the longitudinal beams are detachably connected to the cross beams and the first holder, and the third connection part of the adapter is detachably connected to the cross beams.

In some implementations, a first salient bar and a second salient bar are provided on the first side surface of the first side frame facing the display module;

a first mounting groove is defined by a portion of the first salient bar corresponding to the first holder, a portion of the second salient bar corresponding to the first holder, and the first side frame;

a third salient bar and a fourth salient bar are provided on the second side surface of the second side frame facing the display module; and a second mounting groove is defined by a portion of the third salient bar corresponding to the first holder, a portion of the fourth salient bar corresponding to the first holder, and the second side frame;

the second salient bar and the fourth salient bar are each detachably connected to the backplane; and two opposite ends of the first holder are respectively configured to extend into the first mounting groove and the second mounting groove.

In some implementations, the first holder includes:

a support beam having two ends detachably connected to the first side frame and the second side frame, respectively, the support beam being configured to support the display module; and a reinforcing frame on a side of the support beam facing away from the display module, an end of the reinforcing frame being configured to extend into the first mounting groove and be detachably connected to the first side frame, another end of the reinforcing frame being configured to extend into the second mounting groove and be detachably connected to the second side frame.

In some implementations, the reinforcing frame includes a plurality of first reinforcing beams and a plurality of second reinforcing beams, the first reinforcing beams each extend along the first direction, the second reinforcing beams each extend along a direction intersecting with the first direction, and each of the first reinforcing beams is fixedly connected to more than one of the second reinforcing beams; and the second reinforcing beam closest to the first side frame is at least partially located in the first mounting groove, and the second reinforcing beam closest to the second side frame is at least partially located in the second mounting groove.

In some implementations, the backplane is an arc-shaped backplane, and a shaping strip is provided on a surface of the backplane facing the second holder.

In some implementations, the display apparatus further includes a base provided with a mounting hole, and a portion of the first holder is inserted into the mounting hole.

In some implementations, the connecting beam is provided with a camera mount and a speaker mount, the camera mount is located on a side of the connecting beam facing away from the display module, and configured to mount a camera; and the speaker mount is located on the side of the connecting beam facing away from the display module, and configured to mount a speaker.

In some implementations, the display apparatus further includes:

a housing between the first side frame and the second side frame, and the housing is detachably connected to the first side frame and the second side frame, and forms a mounting cavity together with the connecting beam, the speaker mount and the camera mount are disposed in the mounting cavity.

In some implementations, a light hole and a sound hole are provided in a first side wall of the housing, the light hole is configured to be disposed opposite to the camera mount, and the sound hole is configured to be disposed opposite to the speaker mount.

In some implementations, the camera mount includes:

a first fixing member including a limiting plate and fixing plates on two sides of the limiting plate in a width direction of the limiting plate, a bottom end of each of the fixing plates being fixed on the connecting beam, the limiting plate being connected to the fixing plates, the limiting plate being provided with a limiting hole therein, and the limiting hole having an aperture greater than a diameter of a lens of the camera;

a second fixing member including a mounting plate and connecting plates on two sides of the mounting plate in a width direction of the mounting plate, the connecting plates being hinged to the fixing plates one to one, and the mounting plate and the limiting plate being disposed opposite to each other.

In some implementations, the display apparatus further includes a touch screen fixed on a surface of the first salient bar facing away from the display module and a surface of the third salient bar facing away from the display module.

In some implementations, a sum of a distance from a side surface of the first side frame facing the display module to the display module, and a distance from a side surface of the second side frame facing the display module to the display module, is smaller than a sum of widths of the second salient bar and the fourth salient bar.

BRIEF DESCRIPTION OF DRAWINGS

Accompanying drawings are provided for further understanding of the disclosure and constitute a part of the specification. Hereinafter, these drawings are intended to explain the present disclosure together with the following specific implementations, but should not be considered as a limitation of the present disclosure.

DETAIL DESCRIPTION OF EMBODIMENTS

Hereinafter, specific implementations of the present disclosure will be described with respect to the accompanying drawings. It will be appreciated that the specific implementations as set forth herein are merely for the purpose of illustration and explanation of the present disclosure and should not be constructed as a limitation of the present disclosure.

To make the objects, technical solutions and advantages of the present disclosure clearer, the technical solutions in the embodiments of the present disclosure will now be described clearly and completely with reference to the accompanying drawings. Obviously, the described embodiments are only a part, not all, of embodiments of the present disclosure. All other embodiments obtained by those ordinary skilled in the art based on the described embodiments without any creative labor fall into the protection scope of the present disclosure.

The terminology used herein to describe embodiments of the present disclosure is not intended to limit and/or define the scope of the present disclosure. For example, technical or scientific terms used in the present disclosure are intended to have general meanings as understood by those of ordinary skill in the art, unless otherwise defined. It should be understood that the words “first”, “second” and similar terms used in the present disclosure do not denote any order, quantity, or importance, but are used merely for distinguishing different components. The singular forms "a," "an, "the" and other similar referents do not denote a limitation of quantity, but rather denote the presence of at least one, unless the context clearly dictates otherwise. Words like "comprising" or "including" means that the element or item preceding the word contains elements or items that appear after the word or equivalents thereof, but does not exclude other elements or items. Words like "upper/on", "lower/below", "left", "right" are merely used to indicate a relative positional relationship, and when an absolute position of the described object is changed, the relative positional relationship may be changed accordingly.

Figure 1A:
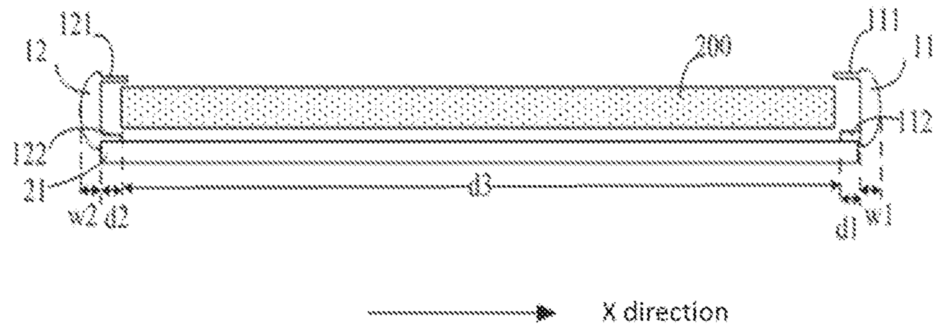
FIG. 1A is a partial sectional view of a display apparatus according to some examples of the present disclosure.
Figure 1B:
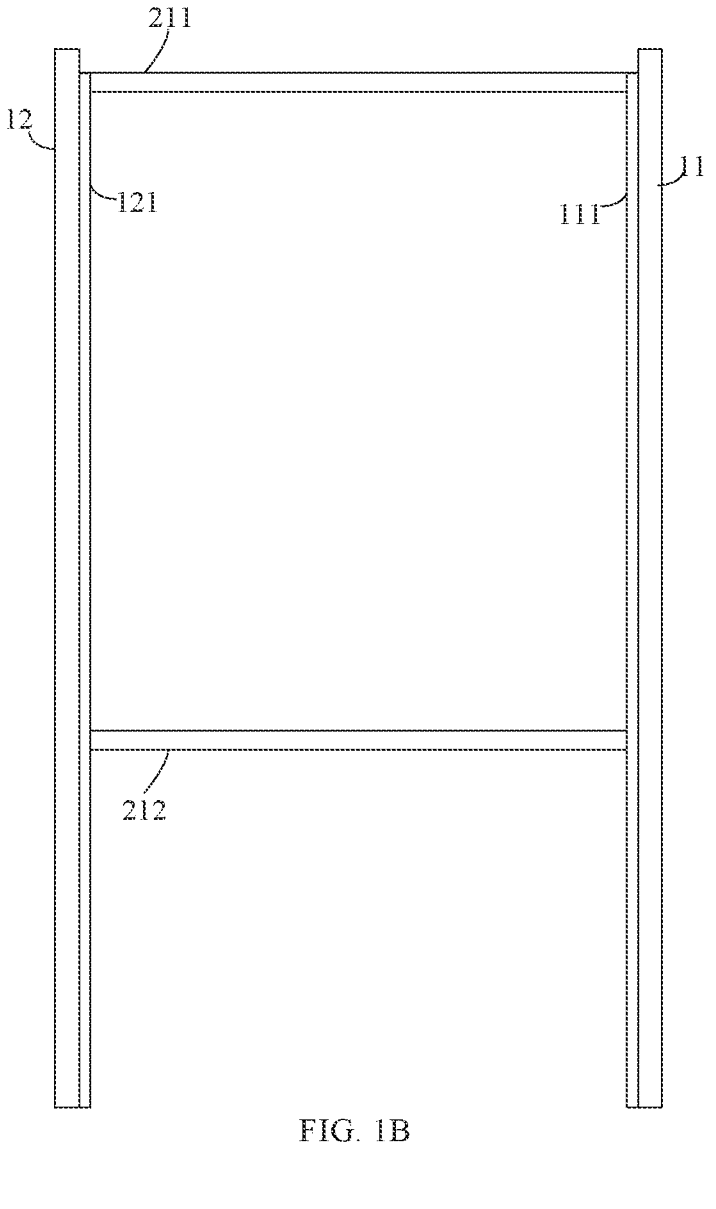
FIG. 1B is a partial front view of a display apparatus according to some examples of the present disclosure.

FIG. 1A is a partial sectional view of a display apparatus according to some examples of the present disclosure, and FIG. 1B is a partial front view of a display apparatus according to some examples of the present disclosure. The display apparatus is of an upright type, for example, may be an electronic signage. As shown in FIG. 1A, the display apparatus includes: a first side frame 11, a second side frame 12, a fixing frame 21 and a backplane (not shown). The first side frame 11, the second side frame 12 and the fixing frame 21 define an accommodation space to receive a display module 200. The display module 200 is a device for display, for example, may be a liquid crystal display module, or an organic light-emitting diode (OLED) display module. The fixing frame 21 includes: an upper cross beam 211, a lower cross beam 212, and a structure on a backlight side of the display module 200. The upper cross beam 211, the lower cross beam 212, the first side frame 11, and the second side frame 12 form a frame-shaped area, the lower cross beam 212 is configured to support the display module 200 when the display apparatus is in a vertical state, and the upper cross beam 211 and the lower cross beam 212 are disposed opposite to each other. A first salient bar 111 and a second salient bar 112 are provided on the first side frame 11, and a third salient bar 121 and a fourth salient bar 122 are provided on the second side frame 12. The first salient bar 111 and the third salient bar 121 are located on a light-emitting side of the display module 200, while the second salient bar 112 and the fourth salient bar 122 are located on a backlight side of the display module 200. The first salient bar 111 and the third salient bar 121 may limit a position of the display module 200 in a thickness direction of the display module 200 (i.e., a direction along which a thickness of the display module 200 is measured), and may support structures, such as a cover plate or a touch screen, on the light-emitting side of the display module 200. The second salient bar 112 and the fourth salient bar 122 are both connected to the fixing frame 21 and the backplane.

During assembly of the display apparatus shown in FIG. 1A, the first side frame 11 is fixedly connected with the second side frame 12 through the upper cross beam 211 and the lower cross beam 212, thereby obtaining the structure shown in FIG. 1B, the upper cross beam 211, the lower cross beam 212, the first side frame 11, and the second side frame 12 form a frame-shaped area. Then the display module 200 is placed into the frame-shaped area along an outward direction perpendicular to the paper in FIG. 1B. In other words, the display module 200 passes through a space between the second salient bar 112 and the fourth salient bar 122 to be placed into the frame-shaped area. Thereafter, other portions of the fixing frame 21 are connected to the second salient bar 112 and the fourth salient bar 122. It can be seen that, in the display apparatus of FIG. 1A, the space between the second salient bar 112 and the fourth salient bar 122 should be greater than a width of the display module 200. In other words, a sum of a distance d1 from an inner side surface of the first side frame 11 to the display module 200, and a distance d2 from an inner side surface of the second side frame 12 to the display module 200, is relatively large, so that the display apparatus has a frame with a relatively large width. The width of the display module 200 refers to a dimension of the display module 200 in the X direction in FIG. 1A. The inner side surface of the first side frame 11 or the second side frame 12 is a surface of the first side frame 11 or the second side frame 12 facing the display module 200.

Figure 2A:
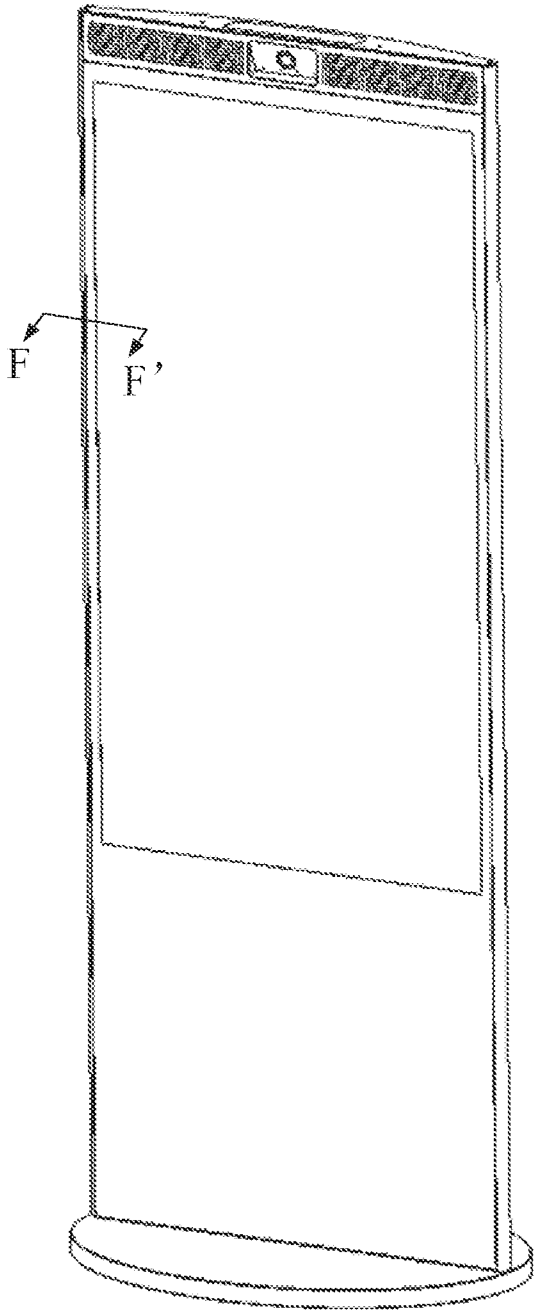
FIG. 2A is an overall schematic diagram of a display apparatus according to some implementations of the present disclosure.
Figure 2B:
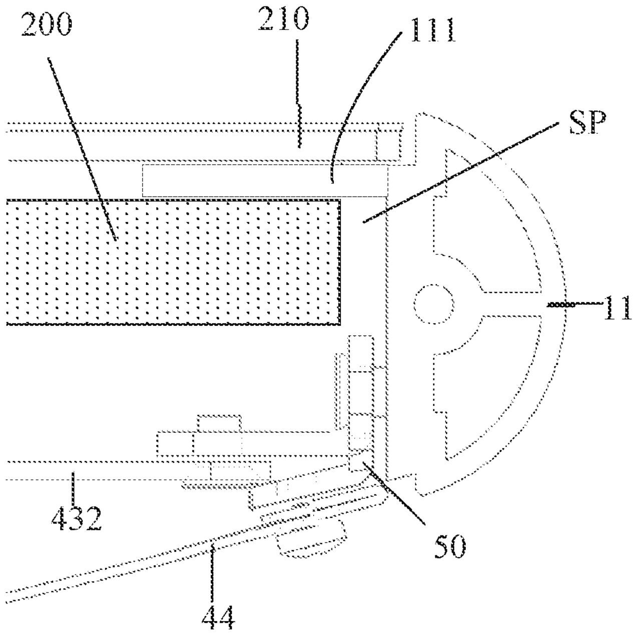
FIG. 2B is a sectional view taken along line F-F' in FIG. 2A.
Figure 2C:
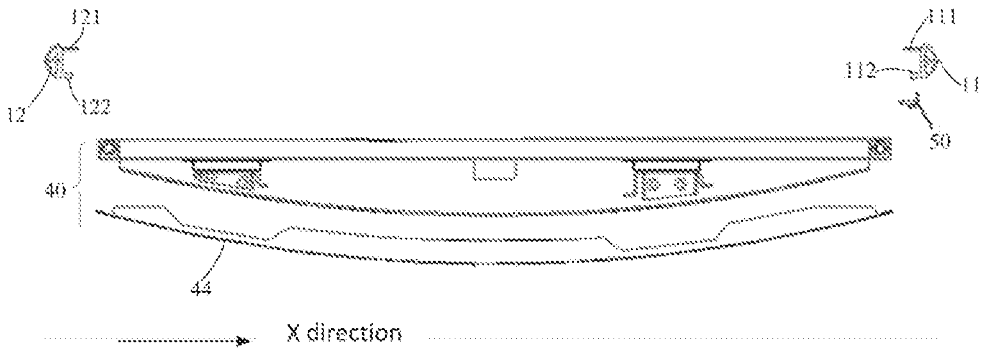
FIG. 2C is a partial exploded view of a display apparatus according to some implementations of the present disclosure.
Figure 3:
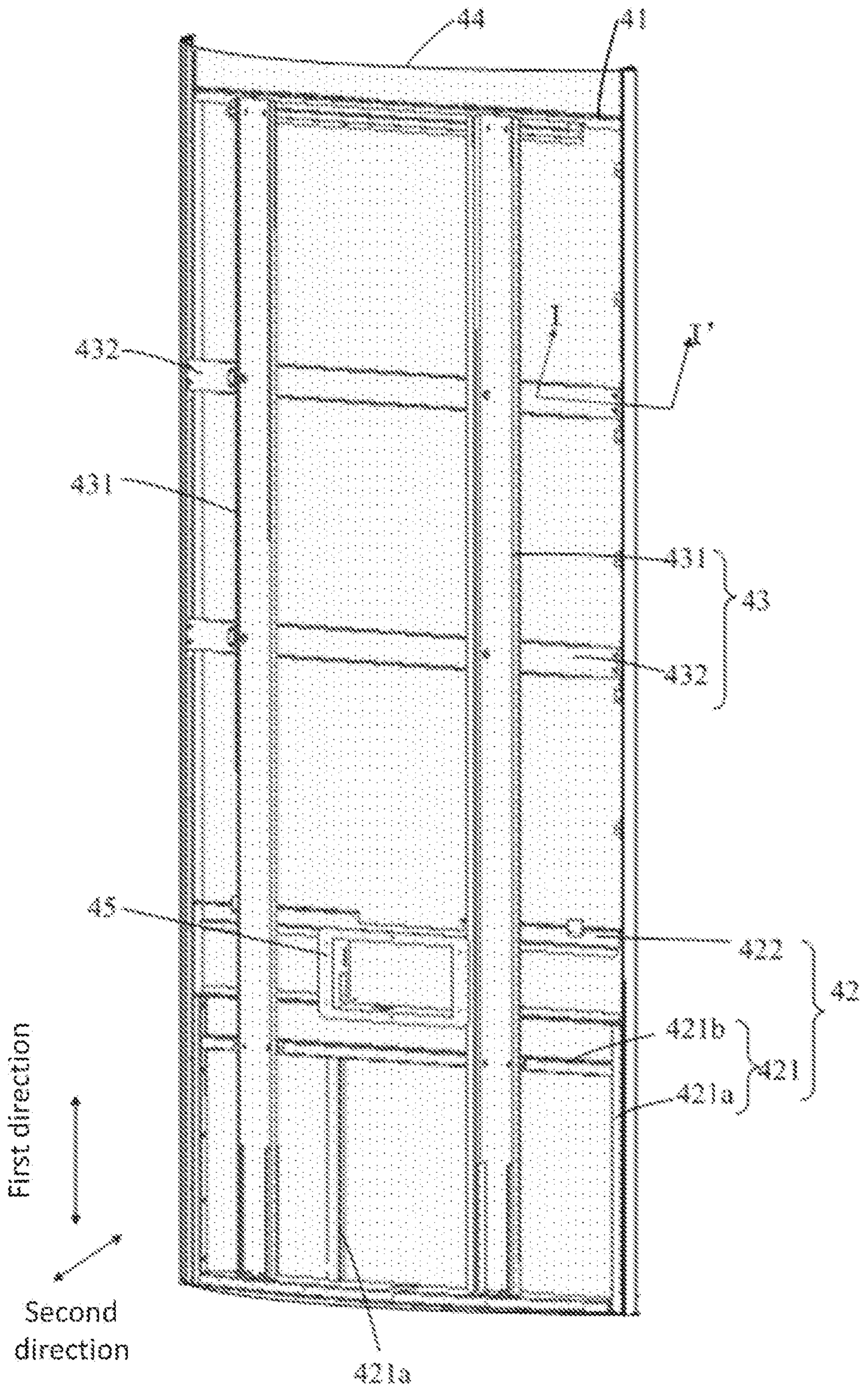
FIG. 3 is a schematic diagram showing a fixing structure connected to a first side frame and a second side frame according to some implementations of the present disclosure.
Figure 4:
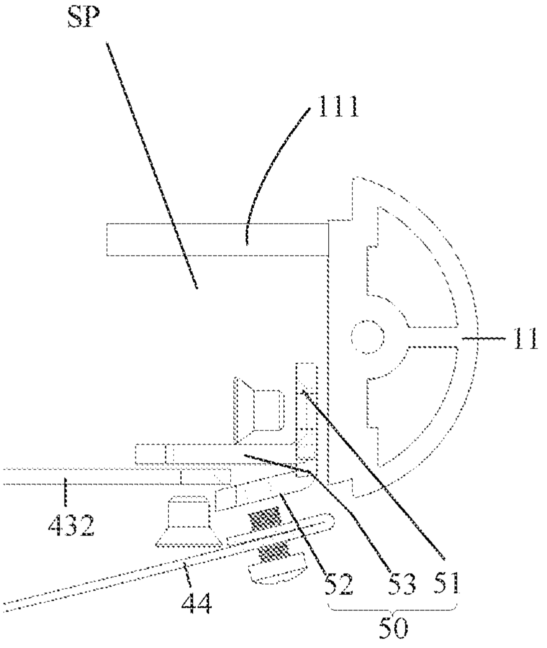
FIG. 4 is a sectional view taken along line I-I' in FIG. 3.
Figure 5A:
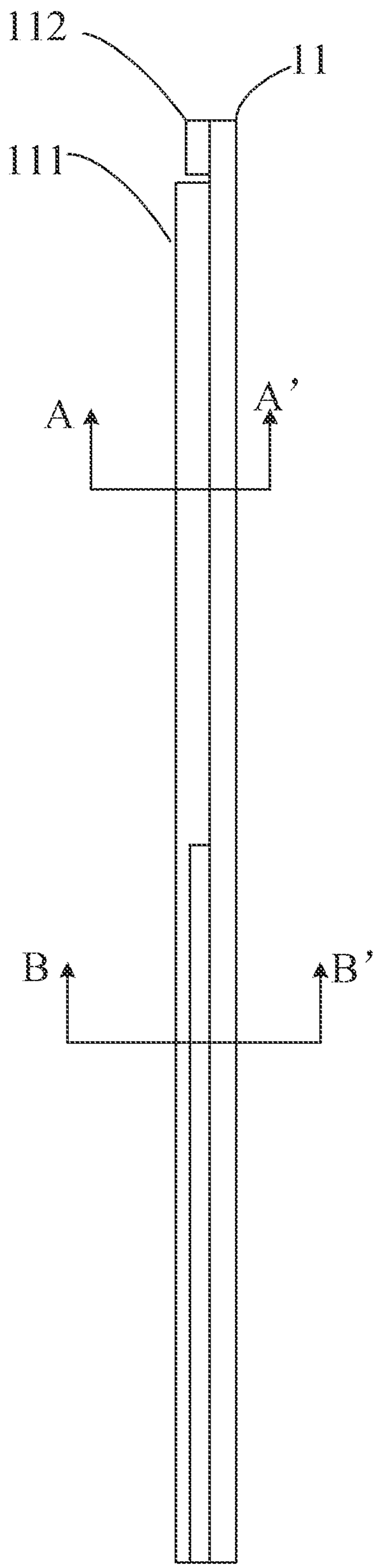
FIG. 5A is a rear view of a first side frame and first and second salient bars thereon according to some implementations of the present disclosure.
Figure 5B:
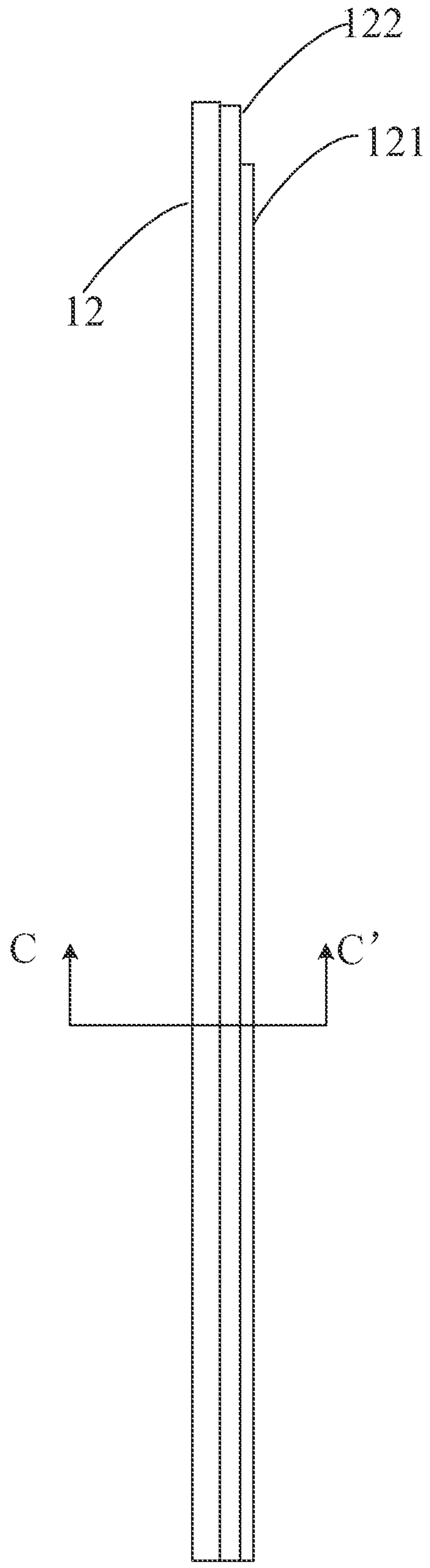
FIG. 5B is a rear view of a second side frame and third and fourth salient bars thereon according to some implementations of the present disclosure.
Figure 6:
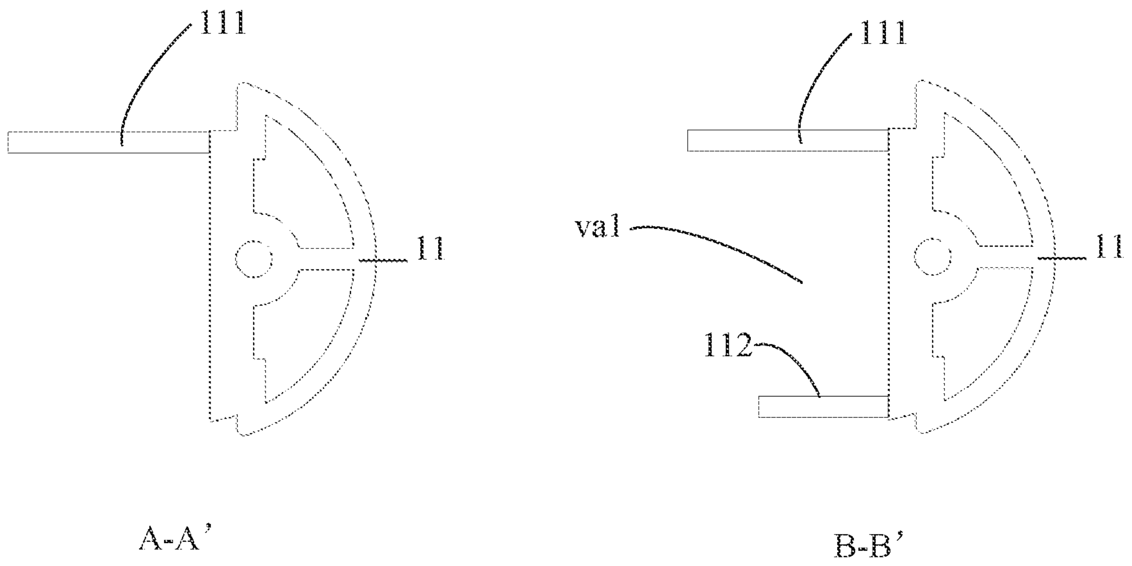
FIG. 6 are sectional views taken along line A-A' and line B-B' in FIG. 5A.
Figure 7:
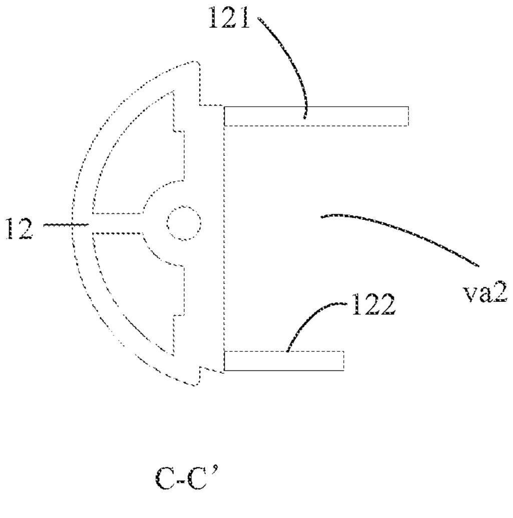
FIG. 7 is a sectional view taken along line C-C' in FIG. 5B.
Figure 8:
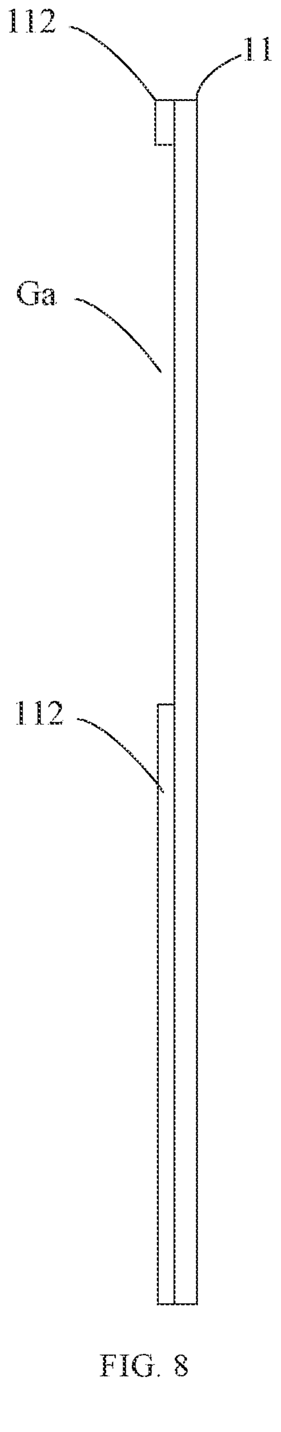
FIG. 8 is a rear view of a first side frame and a second salient bar thereon according to some implementations of the present disclosure.

FIG. 2A is an overall schematic diagram of a display apparatus according to some implementations of the present disclosure, FIG. 2B is a sectional view taken along line F-F' in FIG. 2A, and FIG. 2C is a partial exploded view of a display apparatus according to some implementations of the present disclosure, the display module is not shown in FIG. 2C. As shown in FIGS. 2A to 2C, the display apparatus includes: a first side frame 11 and a second side frame 12 disposed opposite to each other, a fixing structure 40, an adapter 50, and a display module 200. The fixing structure 40 is detachably connected to the first side frame 11 and the second side frame 12. FIG. 3 is a schematic diagram showing a fixing structure connected to a first side frame and a second side frame according to some implementations of the present disclosure. FIG. 3 is a schematic diagram with a perspective effect, obtained from a rear view direction of the display apparatus. FIG. 4 is a sectional view taken along line I-I' in FIG. 3, FIG. 5A is a rear view of a first side frame and first and second salient bars thereon according to some implementations of the present disclosure, FIG. 5B is a rear view of a second side frame and third and fourth salient bars thereon according to some implementations of the present disclosure, FIG. 6 show sectional views taken along line A-A' and line B-B' in FIG. 5A, FIG. 7 is a sectional view taken along line C-C' in FIG. 5B, and FIG. 8 is a rear view of a first side frame and a second salient bar thereon according to some implementations of the present disclosure.

As shown in FIGS. 2A to 4, the first side frame 11 and the second side frame 12 are respectively disposed on two sides of the display module 200 along a width direction of the display module 200 (i.e., a direction along which a width of the display module 200 is measured). The fixing structure 40 is located on a non-light-emitting side of the display module 200. The fixing structure 40, the first side frame 11, and the second side frame 12 define an accommodation space SP for receiving the display module 200, and the display module 200 is located in the accommodation space SP. The fixing structure 40 is configured to fix the display module 200. For example, the display module 200 is detachably connected to the fixing structure 40.

It should be noted that the display module 200 has a light-emitting side and a non-light-emitting side. The light-emitting side is a side in a light-emitting direction of the display module 200 (i.e., a direction in which the display module 200 emits light), that is, a front of the display module 200. The non-light-emitting side is any other side other than the light-emitting side, and includes at least a side opposite to the light-emitting side.

For example, as shown in FIG. 3, the fixing structure 40 may include: a connecting beam 41, a first holder 42, and a second holder 43. Two ends of the connecting beam 41 are detachably connected to the first side frame 11 and the second side frame 12, respectively. The first holder 42 is located between the first side frame 11 and the second side frame 12, and the first holder 42 and the connecting beam 41 are respectively located on two opposite sides of the accommodation space SP in a first direction, the first direction is a height direction of the display apparatus (i.e., a direction along which a height of the display apparatus is measured). The first holder 42 is detachably connected to the first side frame 11 and the second side frame 12. The second holder 43 is at least partially located on a side of the accommodation space in a second direction, the second direction is a thickness direction of the display apparatus (i.e., a direction along which a thickness of the display apparatus is measured). The second holder 43 is detachably connected to the first holder 42. In this case, the first holder 42, the second holder 43, the first side frame 11, and the second side frame 12 may define the accommodation space SP.

It should be noted that the display apparatus may be of an upright type, and is in a vertical state during the display apparatus being used normally, and a display surface of the display module is substantially perpendicular to the horizontal plane. The display apparatus has a thickness direction, a width direction, and a height direction. The height direction refers to an up-down direction when the display apparatus is in a normal service state, the width direction refers to a left-right direction (i.e., the X direction in FIG. 2C) when the display apparatus is in a normal service state, and the thickness direction is a direction perpendicular to the height direction and the width direction. In the embodiment of the present disclosure, a "width" of a certain structure means a dimension of the structure in the width direction of the display apparatus, a "height" of a certain structure means a dimension of the structure in the height direction of the display apparatus, and a "thickness" of a certain structure means a dimension of the structure in the thickness direction of the display apparatus. Therefore, the width direction of the display module 200 is the width direction of the display apparatus, the height direction of the display module 200 is the height direction of the display apparatus, and the thickness direction of the display module 200 is the thickness direction of the display apparatus.

In some implementations, the fixing structure 40 further includes a backplane 44 on a side of the second holder 43 facing away from the accommodation space. It should be noted that, for clarity of illustration, the backplane 44 in FIG. 3 is shown as a structure with a certain transparency, but in fact, the backplane 44 may adopt an opaque structure.

Figure 9A:
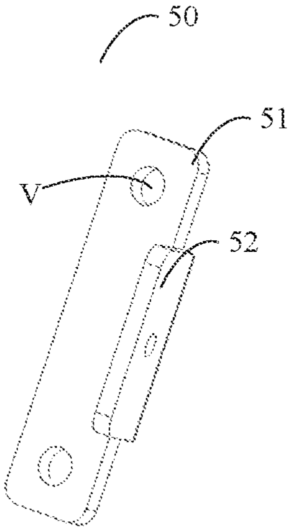
FIG. 9A is a schematic diagram of an adapter according to some implementations of the present disclosure.
Figure 9B:
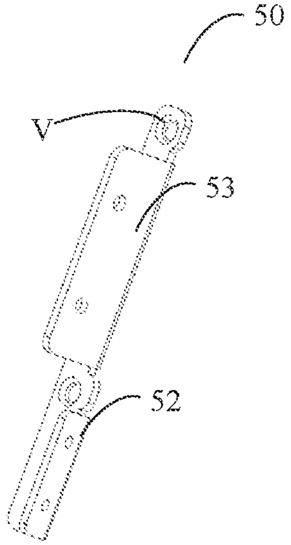
FIG. 9B is a schematic diagram of another adapter according to some implementations of the present disclosure.

FIG. 9A is a schematic diagram of an adapter according to some implementations of the present disclosure, and FIG. 9B is a schematic diagram of another adapter according to some implementations of the present disclosure. As shown in FIGS. 9A and 9B, in some implementations, the adapter 50 includes at least a first connection part 51 and a second connection part 52 which are fixedly connected. At least one of a first side surface of the first side frame 11 facing the display module 200 or a second side surface of the second side frame 12 facing the display module 200 is detachably connected to the first connection part 51, and the second connection part 52 is detachably connected to the fixing structure 40. For example, the second connection part 52 may be detachably connected to the backplane 44. For example, the first connection part 51 and the second connection part 52 each have a plate shape, and are respectively located in planes which are intersected with each other. For example, the first connection part 51 may be fixed on the first side surface of the first side frame 11 (i.e., the surface facing the second side frame 12) via a connecting element; or, be fixed on the second side surface of the second side frame 12 (i.e., the surface facing the first side frame 11) via a connecting element.

For example, a plurality of adapters 50 may be provided to improve stability of the connection. When a plurality of adapters 50 are provided, some of the adapters 50 may adopt the structure shown in FIG. 9A, while the remaining adapters 50 may adopt the structure shown in FIG. 9B. In FIG. 9B, in addition to the first connection part 51 and the second connection part 52, the adapter 50 may further include a third connection part 53, and the third connection part 53 may be connected to a structure other than the backplane 44, for example, may be connected to the second holder 43. For example, the third connection part 53 has a plate shape, and the first connection part 51, the second connection part 52, and the third connection part 53 are respectively located in planes which are intersected with each other. For example, an obtuse angle ranging from 100° to 150° is formed between the first connection part 51 and the second connection part 52; and the third connection part 53 is substantially perpendicular to the first connection part 51. For example, an angle ranging from 80° to 100° is formed between the third connection part 53 and the first connection part 51.

It should be noted that the reference to two structures "being detachably connected" in the embodiment of the present disclosure means that the two structures may be connected via a connecting element, and may be detached from each other, instead of being connected in an non-removable manner, for example, by welding, integral molding, or the like. For example, as shown in FIG. 4, the first connection part 51 of the adapter 50 is connected to the first side frame 11 via a screw, and the second connection part 52 of the adapter 50 is connected to the fixing structure 40 via a screw. Accordingly, as shown in FIGS. 9A and 9B, holes V to be matched with screws are provided in the adapter 50.

In the embodiment of the present disclosure, at least one of a first side surface of the first side frame 11 facing the display module 200 or a second side surface of the second side frame 12 facing the display module 200 is detachably connected to the fixing structure 40 via the adapter 50. Therefore, compared with FIG. 1A, in the embodiment of the present disclosure, the second salient bar 112 at the position of the first side frame 11 corresponding to the display module 200 may be removed, and/or, the fourth salient bar 122 at the position of the second side frame 12 corresponding to the display module 200 may be removed. In this case, for the display module 200 with a certain size, the configuration mode in the embodiment of the present disclosure can reduce a distance between the first side frame 11 and the second side frame 12 while ensuring that the display module can be placed into the accommodation space, and thus the width of the frame of the display apparatus can be reduced.

Figure 10:
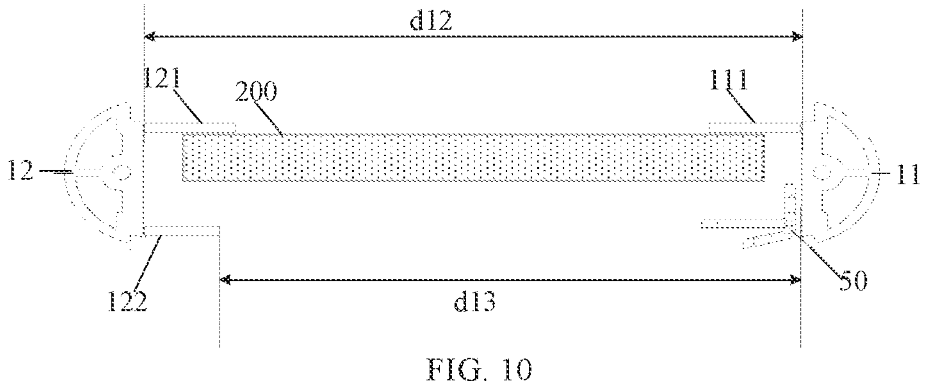
FIG. 10 is a sectional view showing that a first side frame, a second side frame and a display module are assembled according to some implementations of the present disclosure.

Taking the case where the display module 200 has a width of about 707 mm, the second salient bar 112 and the fourth salient bar 122 each have a width of about 9 mm, the first side frame 11 has a width w1 of about 12 mm and the second side frame 12 has a width w2 of about 12 mm as an example, for the structure of FIG. 1A, a distance d3 between the second salient bar 112 and the fourth salient bar 122 is at least about 707 mm, a distance between the first side frame 11 and the second side frame 12 is at least about 707+9*2=725 mm, and the assembled display apparatus has a width of at least about 725+24=749 mm. In contrast, when the adapter 50 is provided in the embodiment of the present disclosure, a sectional view illustrating that the first side frame 11, the second side frame 12 and the display module 200 are assembled is shown in FIG. 10. Since the adapter 50 may function to connect the first side frame 11 or the second side frame 12 with the backplane 44, the second salient bar

112 at the position of the first side frame 11 corresponding to the display module 200 may be removed. In such case, a distance d12 between the first side frame 11 and the second side frame 12 may be reduced to about 717 mm, and then, a distance d13 between the fourth salient bar 122 and the first side frame 11 is about 708 mm, which is greater than the width of the display module 200, and thus ensures that the display module 200 can be placed between the first side frame 11 and the second side frame 12. In this case, the assembled display apparatus has a width of about 708+24=732 mm. Compared with the structure of FIG. 1A, an overall width of the display apparatus is reduced in the embodiment of the present disclosure, while the width of the display area remains unchanged. Therefore, the embodiment of the present disclosure is beneficial to implementing a narrower frame.

As shown in FIGS. 2A to 8, a first salient bar 111 and a second salient bar 112 are provided on a surface of the first side frame 11 facing the second side frame 12. The first salient bar 111 includes a portion corresponding to the first holder 42, and a portion corresponding to the display module 200. A portion of the second salient bar 112 corresponding to the display module 200 forms a notch Ga. In other words, the second salient bar 112 is not provided on the portion of the second side frame 12 corresponding to the first holder 42. A portion of the first salient bar 111 corresponding to the first holder 42, a portion of the second salient bar 112 corresponding to the first holder 42, and the first side frame 11 define a first mounting groove va1. For example, the first salient bar 111 and the second salient bar 112 each may be fixedly connected to the first side frame 11 by welding, integral molding, or the like. For example, the first salient bar 111 has a width greater than that of the second salient bar 112.

A third salient bar 121 and a fourth salient bar 122 are provided on a surface of the second side frame 12 facing the first side frame 11. The third salient bar 121 and the fourth salient bar 122 each include a portion corresponding to the first holder 42, and a portion corresponding to the display module 200. A portion of the third salient bar 121 corresponding to the first holder 42, a portion of the fourth salient bar 122 corresponding to the first holder 42, and the second side frame 12 define a second mounting groove va2. For example, the third salient bar 121 and the fourth salient bar 122 each may be fixedly connected to the second side frame 12 by welding, integral molding, or the like. For example, the third salient bar 121 has a width greater than that of the fourth salient bar 122.

The second salient bar 112 and the fourth salient bar 122 each are detachably connected to the backplane 44; and opposite ends of the first holder 42 are configured to extend into the first mounting groove va1 and the second mounting groove va2 respectively. For example, a portion of the first holder 42 extending into the first mounting groove va1 may be detachably connected to the first side frame 11 via a screw, and a portion of the second holder 43 extending into the second mounting groove va2 may be detachably connected to the second side frame 12 via a screw.

As shown in FIGS. 3 to 7, the first holder 42 includes: a support beam 422 and a reinforcing frame 421. The support beam 422 is equivalent to the lower cross beam 212 in FIG. 1B. Two ends of the support beam 422 are detachably connected to the first side frame 11 and the second side frame 12, respectively, and the support beam 422 is configured to support the display module 200. The reinforcing frame 421 is located on a side of the support beam 422 facing away from the display module 200. In other words, during the display apparatus of the upright type being normally used, the support beam 422 is disposed above the reinforcing frame 421. An end of the reinforcing frame 421 is configured to extend into the first mounting groove va1 and be detachably connected to the first side frame 11. Another end of the reinforcing frame 421 is configured to extend into the second mounting groove va2 and be detachably connected to the second side frame 12.

The reinforcing frame 421 is configured to improve overall structural stability of the display apparatus, and may be made of a structure with a relatively high hardness and a relatively high rigidity. In some implementations, as shown in FIG. 3, the reinforcing frame 421 includes: a plurality of first reinforcing beams 421*a* and a plurality of second reinforcing beams 421*b*. The first reinforcing beams 421*a* each extend along the first direction, the second reinforcing beams 421*b* extend along a direction intersecting with the first direction, and each of the first reinforcing beams 421*a* is fixedly connected to more than one of the second reinforcing beams 421*b*. Illustratively, the reinforcing frame 421 includes: four first reinforcing beams 421*a* and two second reinforcing beams 421*b*. The second reinforcing beams 421*b* each extend along the width direction of the display apparatus. The second reinforcing beam 421*b* close to the first side frame 11 is at least partially located in the first mounting groove va1, and the second reinforcing beam 421*b* close to the second side frame 12 is at least partially located in the second mounting groove va2.

In some implementations, both the first reinforcing beam 421*a* and the second reinforcing beam 421*b* are made of steel, thereby improving rigidity of the reinforcing frame 421. For example, the first reinforcing beam 421*a* and the second reinforcing beam 421*b* each are made of square steel, i.e., a solid bar material.

In some implementations, a junction box 45 is provided between the reinforcing frame 421 and the support beam 422, a signal interface (e.g., a USB interface or an HDMI interface) is disposed in the junction box 45 and is configured to be connected to a signal receiving port of the display module via a transmission line.

As shown in FIG. 3, the second holder 43 includes: a plurality of cross beams 432 and a plurality of longitudinal beams 431. The cross beams 432 are intersected and connected with the longitudinal beams 431. For example, the cross beams 432 are detachably connected to the longitudinal beams 431 through connecting elements such as screws. Each of the cross beams 432 is configured to be detachably connected to the display module in the accommodation space. For example, the display module may be connected to the cross beams 432 via a connector. The longitudinal beams 431 are detachably connected to the cross beams 432 and the first holder 42. The number of the cross beams 432 and the number of the longitudinal beams 431 may be particularly set as desired. The longitudinal beams 431 may be connected to the reinforcing frame 421, and by providing the cross beams 432 intersecting with the longitudinal beams 431, and the reinforcing frame 421, the entire strength of the display apparatus can be improved, and shaking of the machine can be reduced.

Figure 11A:
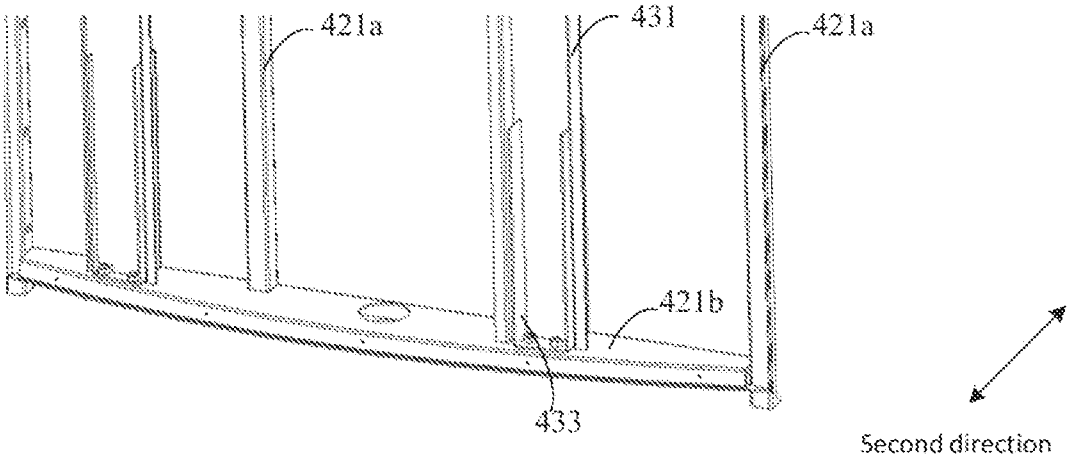
FIG. 11A is a schematic diagram showing a bottom position of a first holder and a longitudinal beam according to some implementations of the present disclosure.

FIG. 11A is a schematic diagram showing a bottom position of a first holder and a longitudinal beam according to some implementations of the present disclosure. As shown in FIG. 11A, one of the second reinforcing beams 421*b* of the first holder 42 is located at a bottom of the first holder 42, and has a larger size in the second direction, so that the bottom end of the longitudinal beam 431 may be disposed on the second reinforcing beam 421*b* at the bottom of the first holder 42.

Figure 11B:
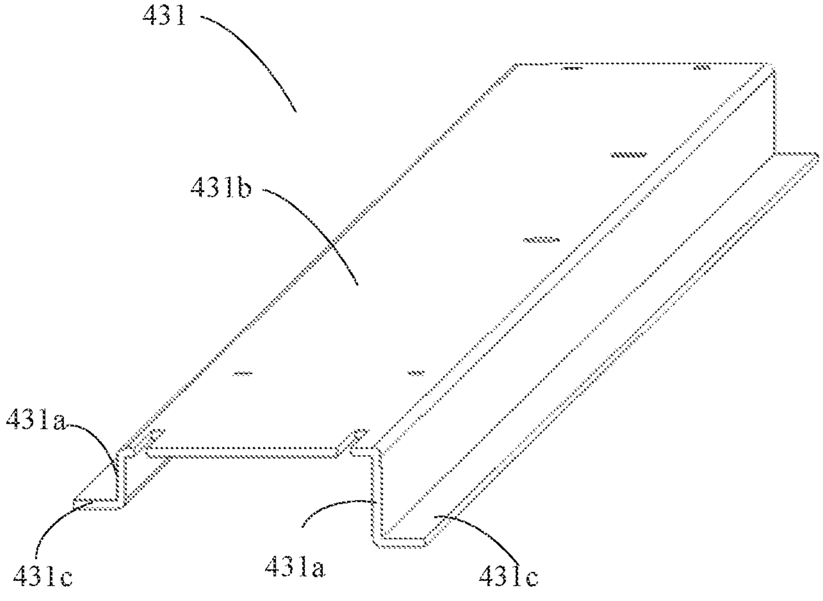
FIG. 11B is a perspective view of a longitudinal beam according to some implementations of the present disclosure.

FIG. 11B is a perspective view of a longitudinal beam according to some implementations of the present disclosure. As shown in FIGS. 3 and 11B, a middle part of each longitudinal beam 431 in a width direction of the longitudinal beam (i.e., a direction in which a width of the longitudinal beam is measured) is bent toward the display module 200 to form a structure with a shape like a Chinese character "几", thereby improving rigidity and strength of the longitudinal beam 431.

As shown in FIG. 11B, each longitudinal beam 431 includes: two first plate parts 431*a* opposite to each other, a second plate part 431*b* connected between the two first plate parts 431*a*, and a third plate part 431*c* connected to each first plate part 431*a*. The second plate part 431*b* is connected to an end of each first plate part 431*a* away from the backplane 44, and the third plate part 431*c* is connected to another end of the first plate part 431*a* close to the backplane 44. As shown in FIG. 3, each longitudinal beam 431 may be disposed on the second reinforcing beam 421*b* at the bottom of the first holder 42 through a U-shaped structure 433. For example, the two first plate parts 431*a* of the longitudinal beam 431 are respectively connected (e.g., welded) to two upright portions of the U-shaped structure 433, and a horizontal portion of the U-shaped structure 433 is detachably connected to the second reinforcing beam 421*b* at the bottom of the first holder 42.

In some implementations, at least one of the adapters 50 adopts the structure shown in FIG. 9B, that is, includes a first connection part 51, a second connection part 52, and a third connection part 53. The first connection part 51 is detachably connected to the first side frame 11, the second connection part 52 is detachably connected to the backplane 44, and the third connection part 53 is detachably connected to the second holder 43. For example, the third connection part 53 is detachably connected to the cross beams 432 of the second holder 43.

Figure 12A:
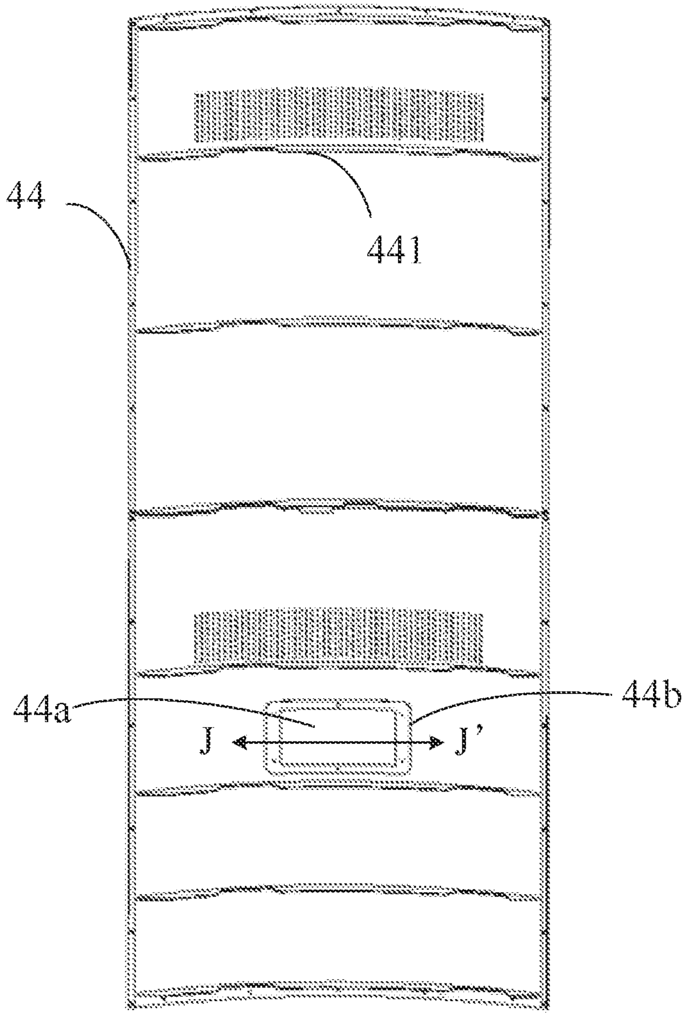
FIG. 12A is a schematic structural view of a backplane according to some implementations of the present disclosure.

FIG. 12A is a schematic structural view of a backplane according to some implementations of the present disclosure. As shown in FIG. 12A, the backplane 44 is an arc-shaped backplane so that a visual effect of having a thin side can be achieved. A shaping strip 441 is provided on a surface of the backplane 44 facing the fixing frame. The arc-shaped backplane is made by pre-bending a steel plate to a certain radian, and then welding the shaping strip 441 to the arc-shaped backplane, so that the steel plate is prevented from being rebounded after being bent. In some implementations, a plurality of shaping strips 441 are provided on the surface of the backplane 44, so that the backplane 44 is bent to a same degree at different positions.

Figure 12B:
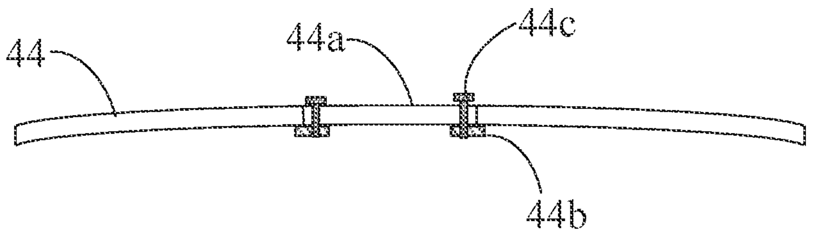
FIG. 12B is a sectional view taken along line J-J' in FIG. 12A.

FIG. 12B is a sectional view taken along line J-Y in FIG. 12A. As shown in FIGS. 12A and 12B, the backplane 44 is provided with a window, a window cover 11*a* matched with the window in size is provided for the window. The backplane 44 is further provided with a connecting ring 44*b*, and the connecting ring 44*b* is fixedly connected, such as welded, to the backplane 44. The window cover 11*a* is connected to the connecting ring 44*b* via a screw 44*c*. The window cover 11*a* is disposed at a position opposite to the junction box 45 shown in FIG. 3.

Figure 13:
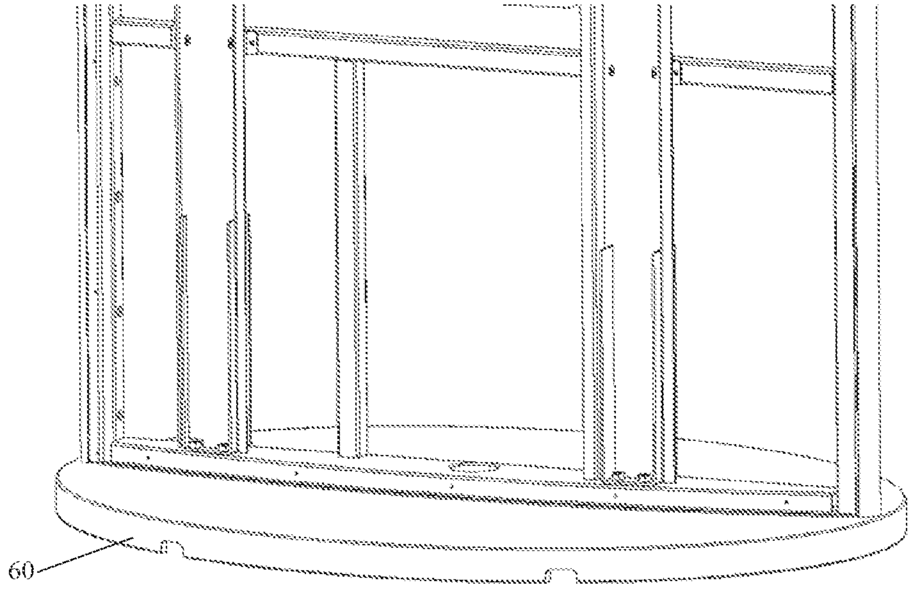
FIG. 13 is a partial schematic diagram showing that a first holder is connected to a base according to some implementations of the present disclosure.
Figure 14:
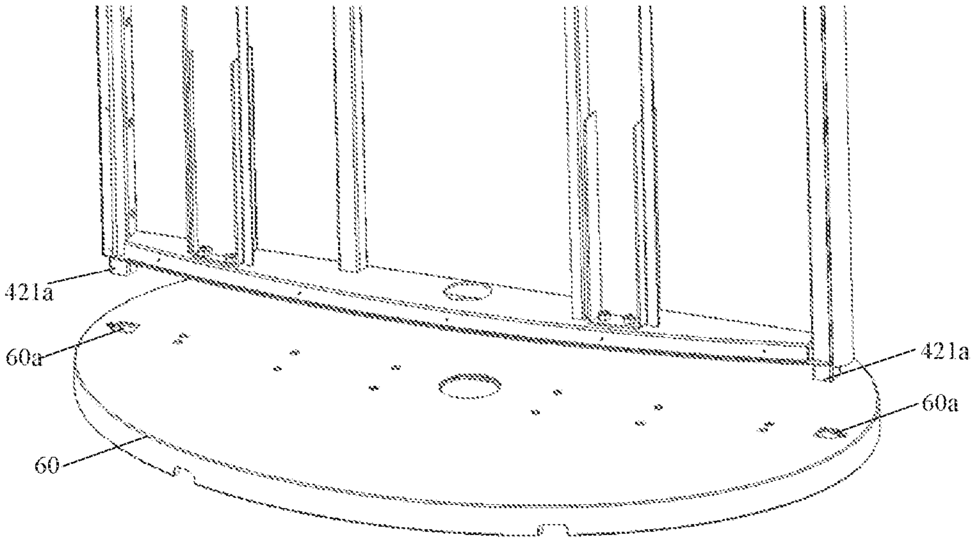
FIG. 14 is a partial schematic diagram showing that a first holder is detached from a base according to some implementations of the present disclosure.

In order to improve stability of the display apparatus being used, in some implementations, the display apparatus further includes a base. FIG. 13 is a partial schematic diagram showing that a first holder is connected to a base according to some implementations of the present disclosure, and FIG. 14 is a partial schematic diagram showing that a first holder is detached from a base according to some implementations of the present disclosure. As shown in FIGS. 13 and 14, the base 60 is provided with a mounting hole 60*a*, and a portion of the first holder 42 is inserted into the mounting hole 60*a*. For example, bottom ends of at least two first reinforcing beams 421*a* of the reinforcing frame 421 of the first holder 42 extend into the mounting hole 60*a*.

It should be noted that, in the embodiment of the present disclosure, a bottom end of a structure refers to an end of the structure close to the base 60, that is, a lower end of the structure when the display apparatus is in the upright state.

Figure 15:
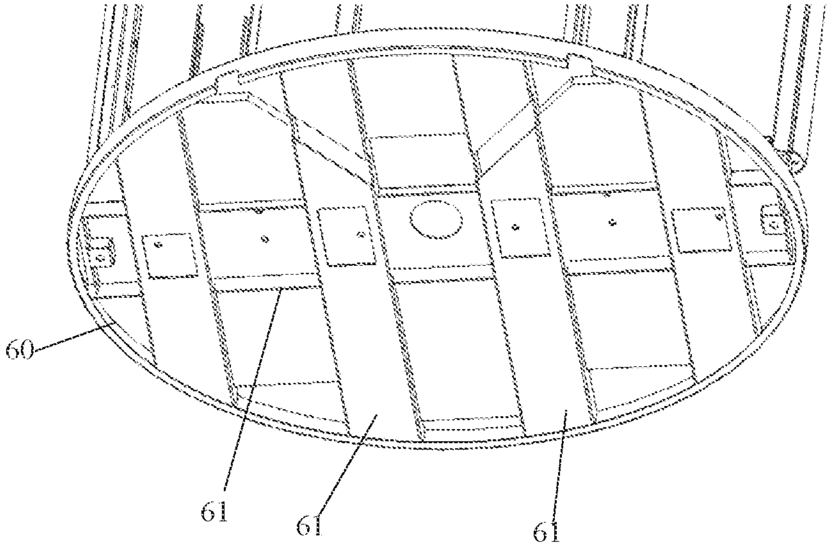
FIG. 15 is a schematic diagram showing a bottom of a base according to some implementations of the present disclosure.

FIG. 15 is a schematic diagram showing a bottom of a base according to some implementations of the present disclosure. As shown in FIG. 15, the base 60 includes a plurality of iron plates 61, and during production, the iron plates 61 may be welded by a welding process to form a base with a desired shape. By manufacturing the base with the iron plates 61, the production cost can be reduced.

Figure 16:
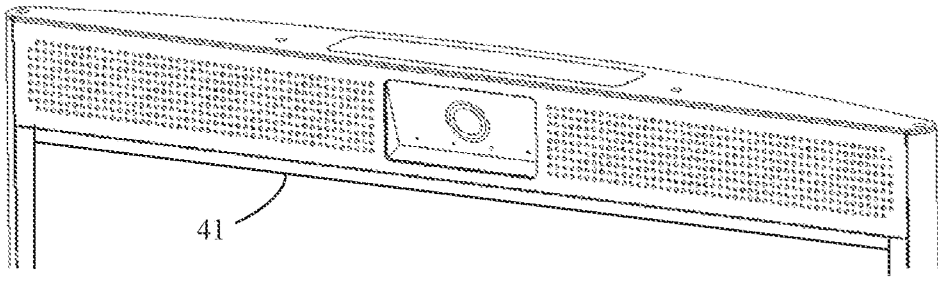
FIG. 16 is a schematic diagram showing a top of a display apparatus according to some implementations of the present disclosure.
Figure 17:
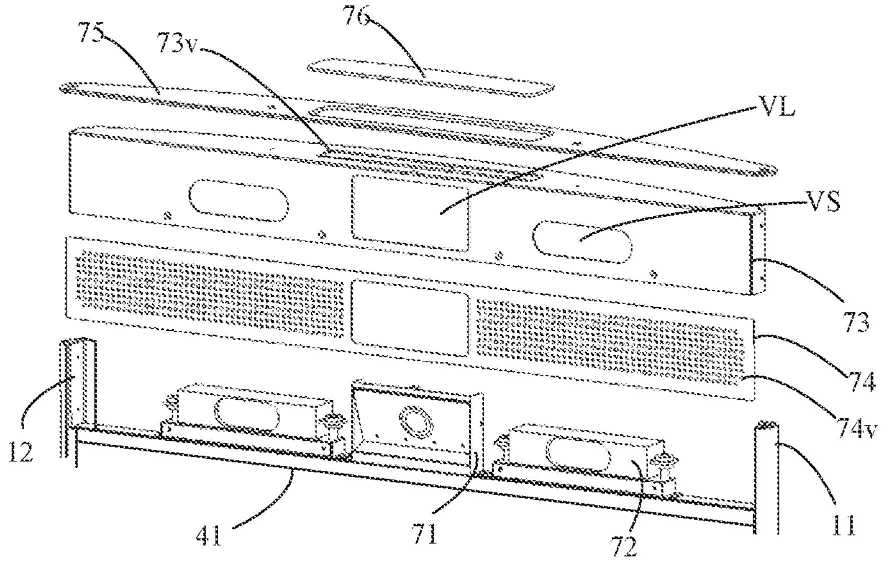
FIG. 17 is an exploded view of structures at a top of a display apparatus according to some implementations of the present disclosure.

FIG. 16 is a schematic diagram showing a top of a display apparatus according to some implementations of the present disclosure, and FIG. 17 is an exploded view of structures at a top of a display apparatus according to some implementations of the present disclosure. As shown in FIGS. 16 and 17, the connecting beam 41 is provided with a camera mount 71 and a speaker mount 72. The camera mount 71 is located on a side of the connecting beam 41 facing away from the display module 200, and is configured to mount a camera. The speaker mount 72 is located on a side of the connecting beam 41 facing away from the display module 200, and is configured to mount a speaker.

As shown in FIG. 17, the display apparatus further includes: a housing 73 between the first side frame 11 and the second side frame 12 and on a side of the connecting beam 41 facing away from the display module 200. The housing 73 is detachably connected to the first side frame 11 and the second side frame 12, and forms a mounting cavity together with the connecting beam 41. The speaker mount 72 and the camera mount 71 are located in the mounting cavity to prevent damage to the camera and the speaker.

In some implementations, as shown in FIG. 17, a light hole VL and a sound hole VS are provided in a first side wall of the housing 73. The light hole VL is configured to face the camera mount 71, so that external light is transmitted into a lens of the camera through the light hole. The sound hole VS is configured to be disposed opposite to the speaker mount 72, so that sound emitted from the speaker is transmitted out through the sound outlet VS.

In some implementations, as shown in FIGS. 16 and 17, a protective plate 74 is further provided on a side of the first side wall of the housing 73 away from the mounting cavity. The protective plate 74 is provided with a plurality of tiny holes 74*v* at a position thereof corresponding to the sound hole VS, and each of the tiny holes 74*v* has an aperture much smaller than either a length or a width of the sound hole VS. A position of the protective plate 74 corresponding to the light hole VL may be made of a light-transmitting material, so that the camera can receive external light while being protected. The protective plate 74 may be connected to the housing 73 by adhesion, or via a connecting element such as a screw.

In some implementations, as shown in FIG. 17, a first through hole 73*v* is provided in a top wall of the housing 73, a cover plate 75 is provided on a side of the top wall away from the mounting cavity, a second through hole 75*v* is provided at a position of the cover plate 75 corresponding to the first through hole 73*v*, and an insulation sheet 76 is fixed in the second through hole 75*v*. The insulation sheet 76 is configured to allow passage of wireless signals (e.g., Wi-Fi signals), so that a signal receiver of the display module can receive the wireless signals. In some implementations, the cover plate 75 is connected to the housing 73, and two ends of the cover plate 75 in the width direction of the display apparatus extend beyond the housing 73 and are connected to the first side frame 11 and the second side frame 12, respectively.

Figure 18:
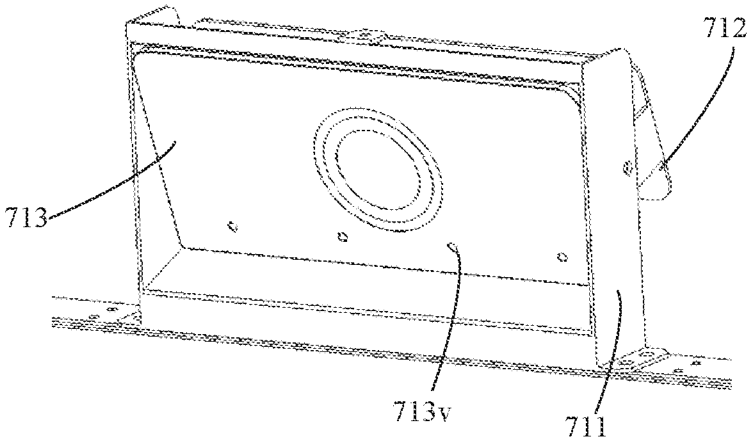
FIG. 18 is a perspective view of a camera mount according to some implementations of the present disclosure.
Figure 19:
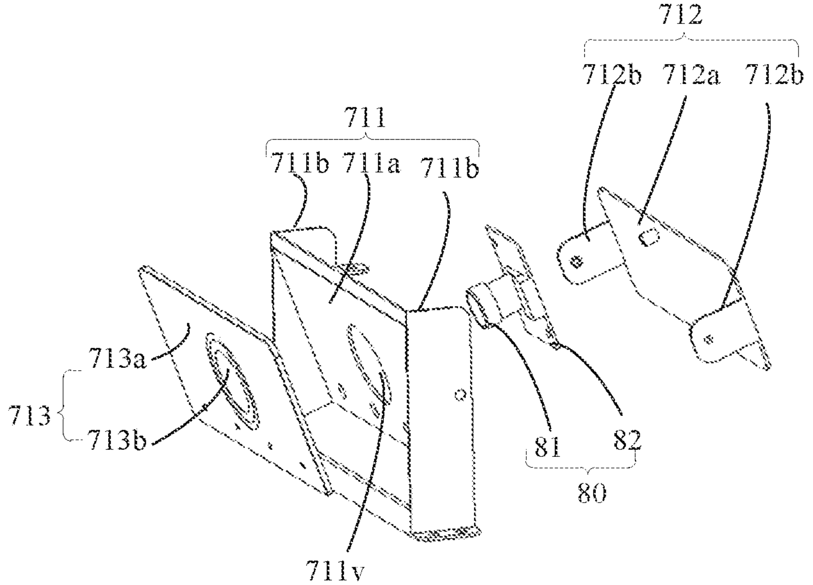
FIG. 19 is an exploded view of a camera mount and a camera according to some implementations of the present disclosure.

FIG. 18 is a perspective view of a camera mount according to some implementations of the present disclosure, and FIG. 19 is an exploded view of a camera mount and a camera according to some implementations of the present disclosure. As shown in FIGS. 18 and 19, the camera mount 71 includes: a first fixing member 711 and a second fixing member 712. The first fixing member 711 includes a limiting plate 711*a* and fixing plates 711*b* on two sides of the limiting plate 711*a* in a width direction of the limiting plate 711*a* (i.e., a direction along which a width of the limiting plate 711*a* is measured). A bottom end of each fixing plate 711*b* is fixed on the connecting beam 41, and the limiting plate 711*a* is provided with a limiting hole 711*v* having an aperture greater than a diameter of a lens of the camera.

The second fixing member 712 includes a mounting plate 712*a* and connecting plates 712*b* on two sides of the mounting plate 712*a* in a width direction of the mounting plate 712*a* (i.e., a direction along which a width of the mounting plate 712*a* is measured). The connecting plates 712*b* are hinged to the fixing plates 711*b* one to one. The mounting plate 712*a* and the limiting plate 711*a* are disposed opposite to each other, and the mounting plate 712*a* is configured to be connected to a rear end of a camera 80 so that a front end of a lens of the camera 80 does not go beyond the limiting hole 711*v*. The front end of the lens of the camera 80 is an end that receives incident light, and the rear end of the camera 80 is an end away from the front end. As shown in FIG. 18, the camera 80 includes a circuit board 82 and a lens 81 fixed on the circuit board 82. The mounting plate 712*a* is configured to fix the circuit board 82, and an end of the lens 81 away from the circuit board 82 is the front end of the camera 80.

In addition, the camera mount 71 further includes a lens plate 713, the lens plate 713 includes a main body plate part 713*a* and a lens 713*b* on the main body plate part 713*a*. The main body plate part 713*a* is fixed on the limiting plate 711*a* by, for example, adhesion, or by connection via a connecting element. The lens 713*b* is disposed opposite to the limiting hole 711*v*. A Mic hole 713*v* may be further disposed in the main body plate part 713*a*.

Since the aperture of the limiting hole 711*v* is greater than the diameter of the lens of the camera 80, and the second fixing member 712 is hinged to the first fixing member, a camera angle of the camera 80 can be adjusted within a certain range by rotating the second fixing member 712.

In some implementations, as shown in FIG. 2A, the display apparatus further includes a touch screen 210. The touch screen 210 is fixed on a surface of the first salient bar 111 facing away from the display module 200 and a surface of the third salient bar 121 facing away from the display module 200. For example, both the surface of the first salient bar 111 facing away from the display module 200 and the surface of the third salient bar 121 facing away from the display module 200 are provided thereon with an adhesive material, so that the touch screen 210 is bonded to the first salient bar 111 and the third salient bar 121.

The touch screen 210 includes: a substrate, and a touch structure layer on the substrate. For example, the substrate includes a portion facing the display module 200 and a portion facing the first holder 42, and the substrate is bonded to the entire first salient bar 111 and the entire second salient bar 112. The touch structure layer faces the display module 200, and is configured to detect occurrence of touch. No touch structure layer is provided on the portion of the substrate facing the first holder 42.

In some implementations, as described above, a notch is provided at a position of the second salient bar 112 corresponding to the display module 200. That is, the second salient bar 112 is not provided at a position of the first side frame 11 facing the display module 200. In such case, a sum of a distance from a side surface of the first side frame 11 facing the display module 200 to the display module 200, and a distance from a side surface of the second side frame 12 facing the display module 200 to the display module 200 may be set to be smaller than a sum of widths of the second salient bar 112 and the fourth salient bar 122, thereby facilitating implementation of a narrower frame.

A method for assembling the display apparatus according to the embodiment of the present disclosure will be described below with reference to FIGS. 2A to 19. The assembly process is as follows.

Both ends of the connecting beam 41 are connected to the first side frame 11 and the second side frame 12, respectively; both ends of the support beam 422 are connected to the first side frame 11 and the second side frame 12, respectively; and the reinforcing frame 421 is connected between the first side frame 11 and the second side frame 12. In such case, the first side frame 11, the second side frame 12, the connecting beam 41, and the support beam 422 form a frame area.

The display module 200 is placed into the frame area so that the display module 200 is located between the first side frame 11 and the second side frame 12.

The first connection part 51 of the adapter 50 is connected to the first side frame 11, the third connection part 53 of the adapter 50 is connected to the cross beams 432, and the display module 200 is fixedly connected to the cross beams 432. The cross beams 432 may be connected to the display module 200 before the display module 200 is placed into the frame area.

The longitudinal beams 431 are connected to the cross beams 432 and the reinforcing frame 421.

The backplane 44 is connected to the fourth salient bar 122, the second salient bar 112, and the third connection part 53 of the adapter 50.

The touch screen 210 is fixedly connected to the first side frame 11 and the third side frame 13. The touch screen 210 may be connected to the first side frame 11 and the third side frame 13 before the display module 200 is placed into the frame area.

The bottom end of the first holder 421 is inserted into the mounting hole 60*a* in the base 60.

Here, before two ends of the connecting beam 41 are connected to the first side frame 11 and the second side frame 12, respectively, the camera may be fixed to the camera mount and the speaker may be fixed to the speaker mount. After the two ends of the connecting beam 41 are connected to the first side frame 11 and the second side frame 12, respectively, the housing 73 may be fixed to the connecting beam 41, the protective plate 74 may be fixed to a side surface of the housing 73, and the cover plate 75 is fixed to the top of the housing 73.

It will be appreciated that the above implementations are merely exemplary implementations for the purpose of illustrating the principle of the present disclosure, and the present disclosure is not limited thereto. It will be apparent to one of ordinary skill in the art that various modifications and variations may be made without departing from the spirit or essence of the present disclosure. Such modifications and variations should be considered as falling into the protection scope of the present disclosure.

What is claimed is:

1. A display apparatus, comprising:
- a display module;
- a first side frame and a second side frame on two sides of the display module in a width direction of the display module;
- a fixing structure on a non-light-emitting side of the display module and detachably connected to the first side frame and the second side frame, the fixing structure being configured to fix the display module; and
- an adapter comprising a first connection part and a second connection part which are fixedly connected,
- wherein at least one of a first side surface of the first side frame facing the display module or a second side surface of the second side frame facing the display module is detachably connected to the first connection part, and the second connection part is detachably connected to the fixing structure,
- wherein the fixing structure comprises:
- a connecting beam having two ends detachably connected to the first side frame and the second side frame, respectively;
- a first holder between the first side frame and the second side frame, wherein the first holder and the connecting beam are respectively located on two opposite sides of the display module in a first direction, the first direction is a height direction of the display apparatus; and the first holder is detachably connected to the first side frame and the second side frame;
- a second holder at least partially on a side of the display module in a second direction, wherein the second direction is a thickness direction of the display apparatus; the second holder is detachably connected to the first holder; and
- a backplane on a side of the second holder facing away from the display module,
- wherein the second connection part is detachably connected to the backplane.

2. The display apparatus according to claim 1, wherein a plurality of adapters are provided, and at least one of the adapters further comprises a third connection part detachably connected to the second holder.

3. The display apparatus according to claim 1, wherein the second holder comprises: a plurality of cross beams and a plurality of longitudinal beams, the cross beams are configured to be detachably connected to the display module, the longitudinal beams are detachably connected to the cross beams and the first holder, and a third connection part of the adapter is detachably connected to the cross beams.

4. The display apparatus according to claim 1, wherein a first salient bar and a second salient bar are provided on a first side surface of the first side frame facing the display module;
- a first mounting groove is defined by a portion of the first salient bar corresponding to the first holder, a portion of the second salient bar corresponding to the first holder, and the first side frame;
- a third salient bar and a fourth salient bar are provided on a second side surface of the second side frame facing the display module; and a second mounting groove is defined by a portion of the third salient bar corresponding to the first holder, a portion of the fourth salient bar corresponding to the first holder, and the second side frame;
- the second salient bar and the fourth salient bar each are detachably connected to the backplane; and two opposite ends of the first holder are configured to extend into the first mounting groove and the second mounting groove respectively.

5. The display apparatus according to claim 4, wherein the first holder comprises:
- a support beam having two ends detachably connected to the first side frame and the second side frame, respectively, the support beam being configured to support the display module; and
- a reinforcing frame on a side of the support beam facing away from the display module; wherein an end of the reinforcing frame is configured to extend into the first mounting groove and be detachably connected to the first side frame; another end of the reinforcing frame is configured to extend into the second mounting groove and be detachably connected to the second side frame.

6. The display apparatus according to claim 5, wherein the reinforcing frame comprises: a plurality of first reinforcing beams and a plurality of second reinforcing beams, the first reinforcing beams each extend along the first direction, the second reinforcing beams each extend along a direction intersecting with the first direction, and each of the first reinforcing beams is fixedly connected to more than one of the second reinforcing beams; and
- the second reinforcing beam closest to the first side frame is at least partially located in the first mounting groove, and the second reinforcing beam closest to the second side frame is at least partially located in the second mounting groove.

7. The display apparatus according to claim 1, wherein the backplane is an arc-shaped backplane, and a shaping strip is provided on a surface of the backplane facing the second holder.

8. The display apparatus according to claim 1, further comprising:
- a base provided with a mounting hole, wherein a portion of the first holder is inserted into the mounting hole.

9. The display apparatus according to claim 1, wherein the connecting beam is provided with a camera mount and a speaker mount, the camera mount is located on a side of the connecting beam facing away from the display module, and is configured to mount a camera; and
- the speaker mount is located on the side of the connecting beam facing away from the display module, and is configured to mount a speaker.

10. The display apparatus according to claim 9, further comprising:
- a housing between the first side frame and the second side frame, wherein the housing is detachably connected to the first side frame and the second side frame, and forms a mounting cavity together with the connecting beam, the speaker mount and the camera mount are disposed in the mounting cavity.

11. The display apparatus according to claim 10, wherein a light hole and a sound hole are provided in a first side wall of the housing, the light hole is configured to be disposed opposite to the camera mount, and the sound hole is configured to be disposed opposite to the speaker mount.

12. The display apparatus according to claim 9, wherein the camera mount comprises:
- a first fixing member comprising a limiting plate and fixing plates on two sides of the limiting plate in a width direction of the limiting plate, wherein a bottom end of each of the fixing plates is fixed on the connecting beam, the limiting plate is connected to the fixing plates, and the limiting plate is provided with a limiting hole having an aperture greater than a diameter of a lens of the camera;

a second fixing member comprising a mounting plate and connecting plates on two sides of the mounting plate in a width direction of the mounting plate, wherein the connecting plates are hinged to the fixing plates one to one; the mounting plate and the limiting plate are disposed opposite to each other.

13. The display apparatus according to claim 4, further comprising:

a touch screen fixed on a surface of the first salient bar facing away from the display module and a surface of the third salient bar facing away from the display module.

14. The display apparatus according to claim 4, wherein a sum of a distance from a side surface of the first side frame facing the display module to the display module, and a distance from a side surface of the second side frame facing the display module to the display module, is smaller than a sum of widths of the second salient bar and the fourth salient bar.

* * * * *